United States Patent Office 2,776,201
Patented Jan. 1, 1957

2,776,201
USE OF AMBLYGONITE AS AN ADDITIVE IN THE LIME-ROASTING OF LITHIUM-ALUMINOSILICATE ORES

Harold Mazza, Stanley L. Cohen, and Glen H. Schafer, Trona, Calif., assignors to American Potash & Chemical Corporation, a corporation of Delaware No Drawing. Application November 25, 1955, Serial No. 549,186

4 Claims. (Cl. 75—1)

This invention relates to recovery of lithium from the lithium-containing ores, spodumene and petalite. It is known that these lithium ores can be roasted with calcium carbonate to render the lithium content water soluble, the soluble lithium salts being, thereafter, extracted. In effecting the roasting of these ores, it is necessary to use relatively high temperatures, e. g., temperatures of the order of 1100° and 1200° C.

We have found that these lithium ores can be successfully roasted with calcium carbonate, at a significantly lower temperature and to economic advantage if amblygonite is present as a constituent in the roast. Apparently, the fluxing constituents in the amblygonite are such that they enable the lithium values to be extracted from such ores when these are first roasted with calcium carbonate at temperatures of the order of 800° to 950° C. It has heretofore been necessary to heat spodumene and petalite to temperatures of the order of 1000°–1200° C. to change their mineral form to one upon which subsequently lime-roasting could be successfully practiced. Thus, the presence of amblygonite in the roast obviates the heating to a high temperature of spodumene or petalite and enables the lime-roast to be carried out at a much lower temperature.

Typical analyses of amblygonite and of the lithium aluminosilicate ores, spodumene and petalite, are given in Table I.

TABLE I

| Ore | Percent | | | | | |
|---|---|---|---|---|---|---|
|  | $Li_2O$ | $K_2O$ | $SiO_2$ | $Al_2O_3$ | F | $P_2O^5$ |
| Amblygonite | 9.14 |  | 6.62 | 33.0 | 5.46 | 44.02 |
| Spodumene | 6.00 | 0.46 | 63.6 | 28.7 | none | trace |
| Petalite | 4.58 | 0.02 | 77.7 | 17.1 | none | 0.002 |

The practice of the present invention will become further apparent upon consideration of the following:

*Example 1.*—A series of roasts were made using (1) mixtures containing approximately 60% petalite and 40% amblygonite and (2) mixtures containing approximately 60% spodumene and 40% amblygonite. The limestone-to-ore ratio on a weight basis was 3.63 to 1 for the petalite-amblygonite mixtures, and 3.2 to 1 for the spodumene-amblygonite mixtures; these ratios were such as to maintain a constant calcium-to-silica ratio in the charge. The individual charges were roasted in stainless steel crucibles in a laboratory muffle furnace under the conditions shown in the following table. The resulting clinkers were each quenched in one liter of hot water and then leached with agitation and at boiling under reflux for sixteen hours. The results obtained are tabulated below:

TABLE II
[Results from 60-40 tests.]

|  | Test No. | | | |
|---|---|---|---|---|
|  | I | II | III | IV |
| Amblygonite, grams | 12.96 | 12.96 | 14.28 | 14.28 |
| Petalite, grams | 19.44 | 19.44 |  |  |
| Spodumene, grams |  |  | 21.42 | 21.42 |
| Limestone, grams | 117.6 | 117.6 | 114.3 | 114.3 |
| Limestone, Ore ratio | 3.63:1 | 3.63:1 | 3.2:1 | 3.2:1 |
| Roast temperature, °C | 885 | 885 | 875 | 875 |
| Roast time, hours | 2 | 2.5 | 2 | 2.5 |
| $CO_2$ content of clinker, percent | 6.1 | 5.9 | 6.6 | 6.0 |
| Lithium recovery, percent | 77.4 | 77.9 | 81.4 | 90.1 |
| Alumina in leach liquor | <0.004 | <0.004 | <0.004 | <0.004 |

*Example 2.*—A series of roasts was made using mixtures of approximately 90% petalite and 10% amblygonite and mixtures of approximately 90% spodumene and 10% amblygonite. The methods of roasting and leaching the charges were identical to those given in Example 1. The results obtained are tabulated below:

TABLE III
[Results from 90-10 tests.]

|  | Test No. | | | |
|---|---|---|---|---|
|  | I | II | III | IV |
| Amblygonite, grams | 3.24 | 3.24 | 3.57 | 3.57 |
| Petalite, grams | 29.16 | 29.16 |  |  |
| Spodumene, grams |  |  | 32.14 | 32.14 |
| Limestone, grams | 117.6 | 117.6 | 114.3 | 114.3 |
| Limestone, Ore ratio | 3.63:1 | 3.63:1 | 3.2:1 | 3.2:1 |
| Roast temp., °C | 900 | 900 | 900 | 900 |
| Roast time, hours | 2 | 2.5 | 2 | 2.5 |
| $CO_2$ content of clinker, percent | 8.4 | 8.3 | 5.1 | 4.1 |
| Lithium recovery, percent | 35.0 | 31.9 | 44.7 | 44.6 |
| Alumina in leach liquor | <0.004 | <0.004 | <0.004 | <0.004 |

From Tables II and III, it will be apparent that a marked improvement in lithium recovery can be obtained when lime-roasting petalite or spodumene at 900° C. by adding a small quantity of amblygonite to the roast mixture. The quantity of amblygonite can be as low as approximately 10% of the weight of the total lithium ore treated. The amblygonite content of the charge can be increased until amblygonite provides substantially the only lithium source but, as we have indicated, the temperature of the roast can be reduced to 900° C. when as little as 10% is present. The utilization of a larger quantity of amblygonite, e. g., about 40%, makes it possible to provide a very economical process for the recovery of lithium values at relatively low roast temperatures.

Spodumene and petalite mixtures can also be roasted successfully by adding amblygonite to such a mixture. The limestone to mixed ore ratio must be based on the effective or available quantity of calcium carbonate present. Thus, one should correct the actual quantity of limestone by taking into account the quantities present of magnesium oxide, silica, and alumina. Magnesium carbonate is effective as a substitute for calcium carbonate to a limited extent. Those skilled in the ore roasting art will have no difficulty in selecting a good limestone and in arriving at the proper quantity of the natural limestone selected.

We claim:

1. In a lime-roast process for recovering lithium, the step comprising roasting a finely divided mixture of calcium carbonate, amblygonite and an ore selected from the group consisting of spodumene, petalite, and mixtures thereof, at a temperature of from about 800° C. to about 950° C., the amblygonite providing at least approximately 10% of the total weight of the lithium ore mixture.

2. In a lime-roast process for recovering lithium, the step comprising roasting a finely divided mixture of calcium carbonate, amblygonite and an ore selected from the group consisting of spodumene, petalite, and mixtures thereof, at a temperature of from about 800° C. to about 950° C., the amblygonite providing at least approximately 40% of the total weight of the lithium ore mixture.

3. In a lime-roast process for recovering lithium, the step comprising roasting a finely divided mixture of calcium carbonate, amblygonite and an ore selected from the lithium-aluminosilicate group consisting of spodumene and petalite, and mixtures thereof, at a temperature of from about 800° C. to about 950° C., the amblygonite providing at least approximately 10% of the total weight of the lithium ore mixture, the available calcium carbonate to amblygonite and ore ratio being between three and four to one.

4. In a lime-roast process for recovering lithium, the step comprising roasting a finely divided mixture of calcium carbonate, amblygonite and an ore selected from the lithium-aluminosilicate group consisting of spodumene and petalite, and mixtures thereof, at a temperature of from about 800° C. to about 950° C., the amblygonite providing at least approximately 40% of the total weight of the lithium ore mixture, the available calcium carbonate to amblygonite and ore ratio being between three and four to one.

References Cited in the file of this patent
UNITED STATES PATENTS

| | | |
|---|---|---|
| 2,020,854 | Rosett | Nov. 12, 1935 |
| 2,662,809 | Kroll | Dec. 15, 1953 |